US012731995B2

(12) United States Patent
Aoki et al.

(10) Patent No.: US 12,731,995 B2
(45) Date of Patent: Sep. 8, 2026

(54) STATIONARY POWER STORAGE SYSTEM

(71) Applicant: TOYOTA JIDOSHA KABUSHIKI KAISHA, Toyota (JP)

(72) Inventors: Yoshinori Aoki, Toyota (JP); Yoshiki Tsuchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 184 days.

(21) Appl. No.: 18/675,959

(22) Filed: May 28, 2024

(65) Prior Publication Data

US 2024/0413639 A1 Dec. 12, 2024

(30) Foreign Application Priority Data

Jun. 8, 2023 (JP) ................................ 2023-094787

(51) Int. Cl.

| | |
|---|---|
| ***H02J 3/46*** | (2026.01) |
| ***H02J 3/32*** | (2006.01) |
| ***H02J 13/12*** | (2026.01) |
| ***H02J 13/34*** | (2026.01) |
| *H02J 103/35* | (2026.01) |

(52) U.S. Cl.

CPC .................. *H02J 3/32* (2013.01); *H02J 3/46* (2013.01); *H02J 13/12* (2026.01); *H02J 13/34* (2026.01); *H02J 2103/35* (2026.01)

(58) Field of Classification Search

CPC .... H01M 10/44; H01M 10/48; H01M 10/441; H01M 10/4207; H01M 10/443; H01M 10/482; H01M 10/486; H02J 2207/20; H02J 7/02; H02J 7/35; H02J 3/32; H02J 3/381; H02J 3/003; H02J 3/004; H02J 3/322; H02J 3/38; H02J 3/46; H02J 3/14; H02J 3/28; H02J 3/388

See application file for complete search history.

(56) References Cited

U.S. PATENT DOCUMENTS

| | | | | |
|---|---|---|---|---|
| 2013/0229152 | A1 | 9/2013 | Kurimoto | |
| 2015/0069844 | A1 * | 3/2015 | Wu ........................... | H02J 3/32 307/82 |
| 2016/0352111 | A1 | 12/2016 | Arita et al. | |
| 2018/0241097 | A1 * | 8/2018 | Yamasaki ........... | H01M 10/441 |

FOREIGN PATENT DOCUMENTS

| | | | |
|---|---|---|---|
| JP | 2012-113856 | A | 6/2012 |
| JP | 2015-162917 | A | 9/2015 |
| JP | 2016-184476 | A | 10/2016 |

* cited by examiner

*Primary Examiner* — Bryan R Perez

(74) *Attorney, Agent, or Firm* — Dinsmore & Shohl LLP

(57) ABSTRACT

A stationary power storage system includes a control device configured to control a current value of each of a plurality of power storage devices. Each of the plurality of power storage devices is configured to be switchable between conduction and interruption in accordance with a command from the control device. The control device is configured to select at least one power storage device to be used for energy management from the plurality of power storage devices and interrupt a current of at least one power storage device that has not been selected. The control device is configured to, for the energy management, control a current value of the power storage device that has been selected, and during execution of the energy management, acquire an output value, when no current flows, of at least one current sensor corresponding to at least one power storage device that has not been selected.

6 Claims, 4 Drawing Sheets

POWER [W]
POWER TYPE BATTERY
L1
Y
0
X
REQUEST Wh IS LARGE
REQUEST CHARACTERISTICS: REQUEST W, REQUEST Wh
CAPACITY TYPE BATTERY
L2
REQUEST W IS LARGE
ENERGY [Wh]
POWER GENERATION [W]
REQUEST W (CHARGING)
L12
L11
REQUEST W (DISCHARGING)
TIME
ENERGY [Wh]
REQUEST Wh (CHARGING)
L22
REQUEST Wh (DISCHARGING)
L21
MORNING
DAYTIME
NIGHT
TIME

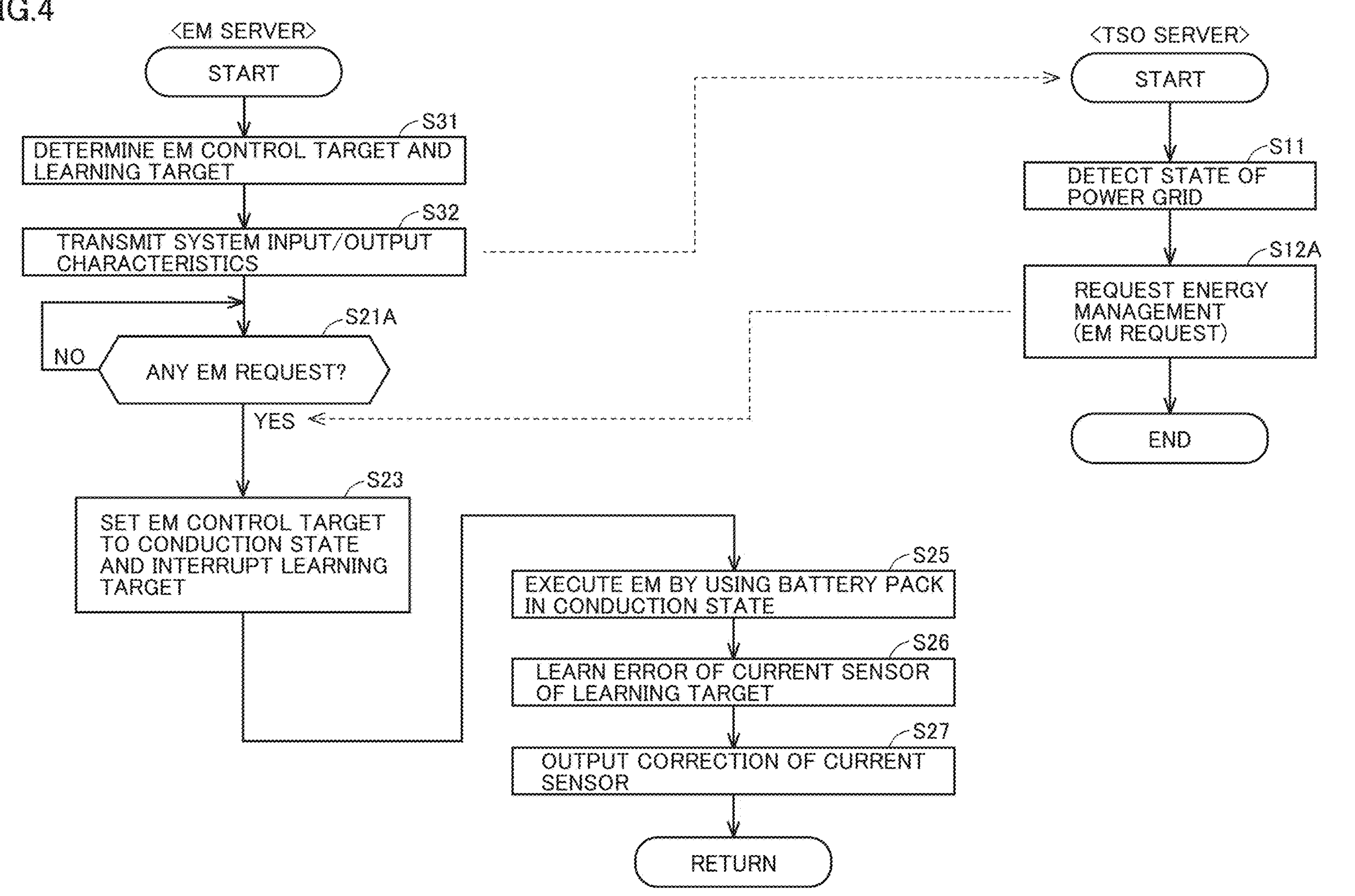
FIG.4
〈EM SERVER〉
START
S31
DETERMINE EM CONTROL TARGET AND LEARNING TARGET
S32
TRANSMIT SYSTEM INPUT/OUTPUT CHARACTERISTICS
S21A
ANY EM REQUEST?
NO
YES
S23
SET EM CONTROL TARGET TO CONDUCTION STATE AND INTERRUPT LEARNING TARGET
S25
EXECUTE EM BY USING BATTERY PACK IN CONDUCTION STATE
S26
LEARN ERROR OF CURRENT SENSOR OF LEARNING TARGET
S27
OUTPUT CORRECTION OF CURRENT SENSOR
RETURN
〈TSO SERVER〉
START
S11
DETECT STATE OF POWER GRID
S12A
REQUEST ENERGY MANAGEMENT (EM REQUEST)
END

STATIONARY POWER STORAGE SYSTEM

CROSS REFERENCE TO RELATED APPLICATIONS

This nonprovisional application is based on Japanese Patent Application No. 2023-094787 filed on Jun. 8, 2023 with the Japan Patent Office, the entire contents of which are hereby incorporated by reference.

BACKGROUND

Field

The present disclosure relates to a stationary power storage system.

Description of the Background Art

Japanese Patent Laying-Open No. 2012-113856 discloses a vehicle including a battery pack in which a plurality of battery stacks are connected in parallel.

SUMMARY

In the vehicle described in Japanese Patent Laying-Open No. 2012-113856, a system main relay (SMR) is provided in each of a plurality of battery stacks (power storage devices). In such a vehicle, in order to control the current value of each battery stack, it is conceivable to provide a current sensor in each of the battery stacks connected in parallel. In order to perform current control with high accuracy, it is desirable to perform output correction (e.g., offset correction) of each current sensor while checking an output value, when no current flows, of each current sensor. In the vehicle, for example, when the start switch is turned off at the end of traveling, it is considered that the SMR corresponding to each battery stack is brought into the interruption state and the current does not flow to each battery stack. For this reason, the vehicle may be able to acquire an output value, when no current flows, of each current sensor after the traveling ends. The start switch of the vehicle is generally referred to as a "power switch" or an "ignition switch".

However, in a stationary power storage system in which energy management is performed using a power storage device, it is required to keep the power storage device in a conduction state for energy management. The power storage device in the interruption state cannot be used for the energy management. For this reason, in the stationary power storage system, there is a problem that the output correction of the current sensor provided in the power storage device is insufficient and the accuracy of the current control of the power storage device is likely to decrease.

The present disclosure has been made to solve the above problem, and an object thereof is to provide a stationary power storage system that can perform energy management with high accuracy using a power storage device.

A stationary power storage system according to an embodiment of the present disclosure includes: a plurality of power storage devices; a plurality of current sensors provided in the plurality of power storage devices, respectively; and a control device configured to control a current value of each of the plurality of power storage devices. Each of the plurality of power storage devices is configured to be switchable between conduction and interruption in accordance with a command from the control device. The control device is configured to select at least one power storage device to be used for energy management from the plurality of power storage devices and interrupt a current of at least one power storage device that has not been selected, for the energy management, control a current value of the at least one power storage device that has been selected, and during execution of the energy management, acquire an output value, when no current flows, of at least one current sensor corresponding to the at least one power storage device that has not been selected of the plurality of current sensors.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a diagram showing a modification of the energy management method shown in FIG. 2.

DESCRIPTION OF THE EMBODIMENTS

Figure 1:
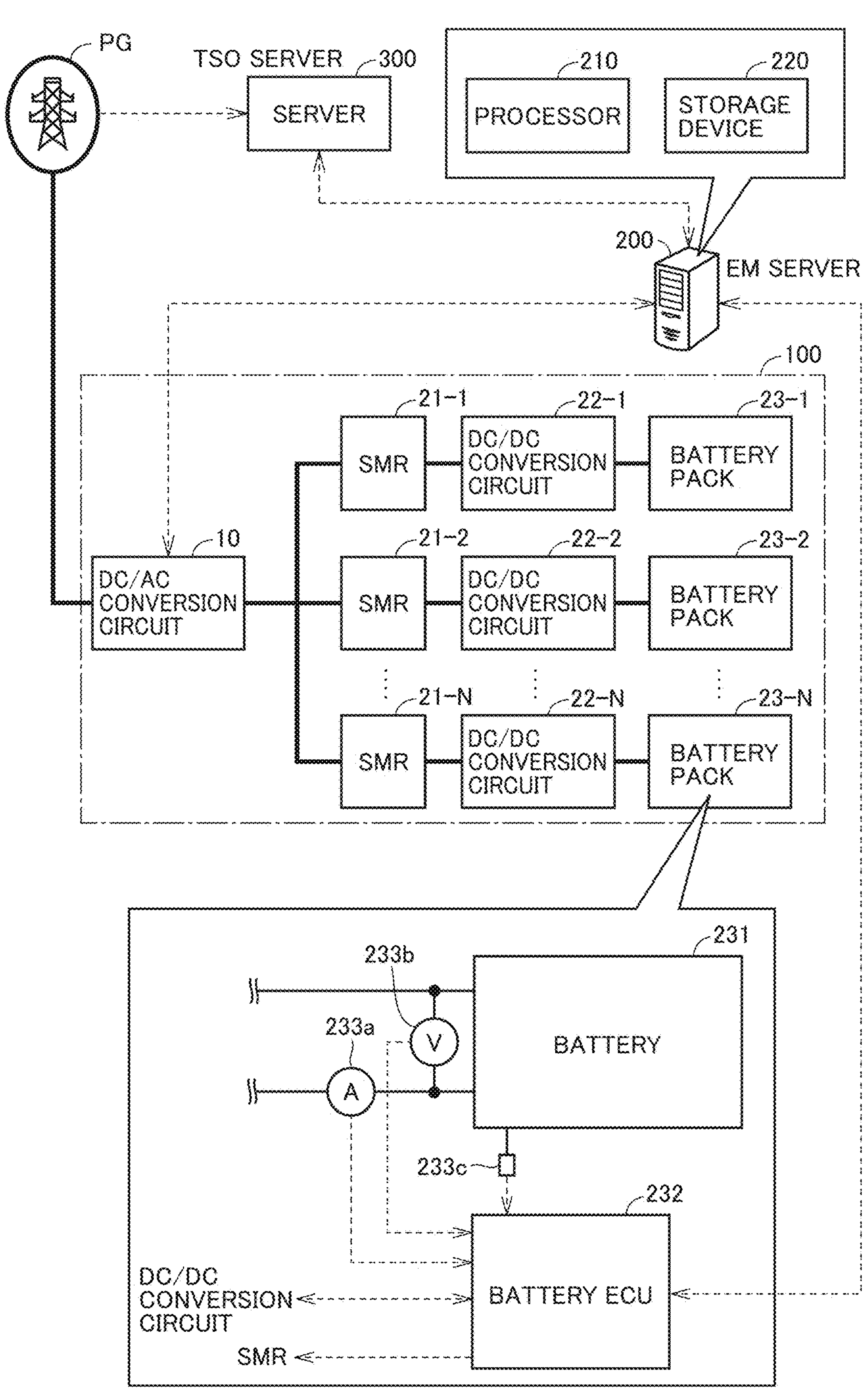
FIG. 1 is a diagram illustrating a schematic configuration of an energy management system according to an embodiment of the present disclosure.

Embodiments of the present disclosure will be described in detail with reference to the drawings. In the drawings, the same or corresponding parts are denoted by the same reference numerals, and the description thereof will not be repeated.

FIG. 1 is a diagram illustrating a schematic configuration of an energy management system according to an embodiment of the present disclosure. Referring to FIG. 1, the energy management system according to this embodiment includes a power storage system 100 and a server 200 (EM server), and performs energy management of a power grid PG. The server 200 is configured to communicate with a server 300 (a TSO server) that manages the power grid PG. "EM" means energy management. "TSO" means a transmission system operator. The power grid PG is an electric power network constructed by a power plant and a power transmission and distribution facility. The server 300 includes a processor and a storage device, monitors a state (for example, supply and demand balance and frequency) of the power grid PG, and requests energy management from the server 200. Accordingly, the power grid PG is maintained in a state in which high-quality power can be stably supplied. The power grid PG is, for example, an AC grid provided by a power company.

The power storage system 100 includes a DC/AC conversion circuit 10, N SMRs 21-1 to 21-N (to be described as "SMR 21" when not distinguished), N DC/DC conversion circuits 22-1 to 22-N (to be described as "DC/DC conversion circuit 22" when not distinguished), and N battery packs 23-1 to 23-N (to be described as "battery pack 23" when not distinguished). The SMR means a system main relay. The SMR 21, the DC/DC conversion circuit 22, and the battery pack 23 correspond to examples of the "relay", the "power conversion circuit", and the "power storage device" according to the present disclosure, respectively. The power storage system 100 is controlled by the server

200. N is, for example, about 50. However, N may be a natural number of 2 or more, and may be 100 or more. The power storage system 100 may further include an electric leakage detector (not shown) (e.g., a breaker that automatically interrupts current when electric leakage is detected).

The battery packs 23-1 to 23-N are connected in parallel to each other. The battery packs 23-1 to 23-N are provided with SMRs 21-1 to 21-N and DC/DC conversion circuits 22-1 to 22-N, respectively. Each of the battery packs 23-1 to 23-N is configured to be capable of switching between conduction and interruption in accordance with an instruction from the server 200. A current can flow through the battery pack 23 in the conduction state. On the other hand, no current flows through the battery pack 23 in the interruption state. In this embodiment, the SMR 21 is configured to switch between conduction and interruption of the corresponding battery pack 23 in accordance with an instruction from the server 200. The SMR 21 is provided in an electric path connecting the DC/AC conversion circuit 10 and the DC/DC conversion circuit 22. The SMR 21 is, for example, an electromagnetic mechanical relay. The disconnection/connection of the electric path is switched by the opening and closing of the SMR 21.

The DC/AC conversion circuit 10 is configured to output AC power to the power grid PG in accordance with an instruction from the server 200. The DC/AC conversion circuit 10 is configured to convert AC power input from the power grid PG into DC power and output the DC power to each of the DC/DC conversion circuits 22-1 to 22-N. The DC/DC conversion circuit 22 is configured to transform the output voltage of the corresponding battery pack 23 in accordance with an instruction from the server 200. In addition, the DC/DC conversion circuit 22 is configured to convert the DC power input from the DC/AC conversion circuit 10 in accordance with an instruction from the server 200, and output the converted DC power to the corresponding battery pack 23.

Specifically, when DC power is input from the battery pack 23 to the corresponding DC/DC conversion circuit 22, the DC/DC conversion circuit 22 outputs DC power according to an instruction from the server 200 to the DC/AC conversion circuit 10. Then, the DC/AC conversion circuit 10 outputs AC power according to the instruction from the server 200 to the power grid PG (reverse power flow). On the other hand, when AC power is input from the power grid PG to the DC/AC conversion circuit 10 (forward flow), the DC/AC conversion circuit 10 outputs DC power according to a command from the server 200 to each of the DC/DC conversion circuits 22-1 to 22-N. Each of the DC/DC conversion circuits 22-1 to 22-N outputs DC power according to the instruction from the server 200 to the corresponding battery pack 23. The output power of each DC/DC conversion circuit may be the same or different. The server 200 may determine the output power of each DC/DC conversion circuit according to the corresponding battery pack 23.

The server 200 includes a processor 210 and a storage device 220. An example of the processor 210 is a CPU (Central Processing Unit). The storage device 220 is configured to store written information. The battery packs 23-1 to 23-N included in the power storage system 100 are registered in the server 200. The storage device 220 stores information related to each battery pack (for example, specifications, control information, and sensor information) in such a manner that the information is distinguished by identification information (battery ID) of the battery pack. The control information includes information for the server 200 to individually control the SMR 21 and the DC/DC conversion circuit 22 corresponding to each battery pack. The sensor information includes a correction factor for the sensor output.

The battery pack 23 includes a battery 231, a battery ECU (Electronic Control Unit) 232, a current sensor 233*a* that detects a current flowing through the battery 231, a voltage sensor 233*b* that detects a voltage of the battery 231, and a temperature sensor 233*c* that detects a temperature of the battery 231. The detection results of the respective sensors are input to the battery ECU 232. The battery ECU 232 includes a processor (not shown) and a storage device (not shown), and records the detection result of each sensor in the storage device in association with the detection time. Further, the battery ECU 232 calculates the SOC (State Of Charge) of the battery 231 from the detection results of the respective sensors, and records the SOC of the battery 231 in the storage device in association with the time. The SOC represents the remaining amount of power storage by, for example, the ratio of the current amount of power storage to the amount of power storage in a fully charged state. The battery ECU 232 outputs data recorded in the storage device to the server 200 in response to a request from the server 200.

The battery ECU 232 controls each of the SMR 21 and the DC/DC conversion circuit 22 in accordance with a command from the server 200. The battery ECU 232 converts a command from the server 200 into a control signal for each of the SMR 21 and the DC/DC conversion circuit 22. The server 200 controls each of the SMRs 21-1 to 21-N and the DC/DC conversion circuits 22-1 to 22-N via the battery ECU 232.

The battery 231 may be one secondary battery or a battery assembly configured by electrically connecting a plurality of secondary batteries. The battery packs 23-1 to 23-N may include secondary batteries of the same type or may include secondary batteries of different types. Examples of the secondary battery include a lithium ion battery and a nickel-metal hydride battery. The secondary battery may be any of a liquid secondary battery, a semi-solid secondary battery, and an all-solid secondary battery.

The battery pack 23 corresponds to a stationary power storage device. A battery pack (including a drive battery and a battery ECU) used in an electrically powered vehicle may be reused as the battery pack 23. The inverter and the DC/DC converter used in an electrically powered vehicle may be reused as the DC/AC conversion circuit 10 and the DC/DC conversion circuit 22, respectively. The power storage system 100 functions as a stationary energy storage system (ESS). In this embodiment, the server 200 and the battery ECU 232 function as a "control device" according to the present disclosure.

Incidentally, in order to perform current control of each of the battery packs 23-1 to 23-N with high accuracy, it is desirable that the server 200 performs output correction (e.g., offset correction) of each current sensor while checking an output value when no current flows in the current sensor 233*a* of each of the battery packs 23-1 to 23-N. However, in a stationary power storage system, it is required to keep the power storage device in a conduction state for energy management. The power storage device in the interruption state cannot be used for energy management. For this reason, there is a problem that the output correction of the current sensor provided in the power storage device becomes insufficient, and the accuracy of the current control of the power storage device tends to decrease.

Therefore, in this embodiment, the server 200 acquires an output value (hereinafter, referred to as a "zero output value") when no current flows in the current sensor 233*a* corresponding to the battery pack 23 not used for energy management during execution of energy management, and performs output correction (correction of detection error) of the current sensor 233*a* based on the acquired zero output value. This makes it possible to perform energy management with high accuracy using the battery pack 23. In addition, the server 200 controls the power storage system 100 so that energy management of the power grid PG is executed in response to a request from the server 300 that manages the power grid PG. The server 200 always accepts a request from the server 300.

Figure 2:
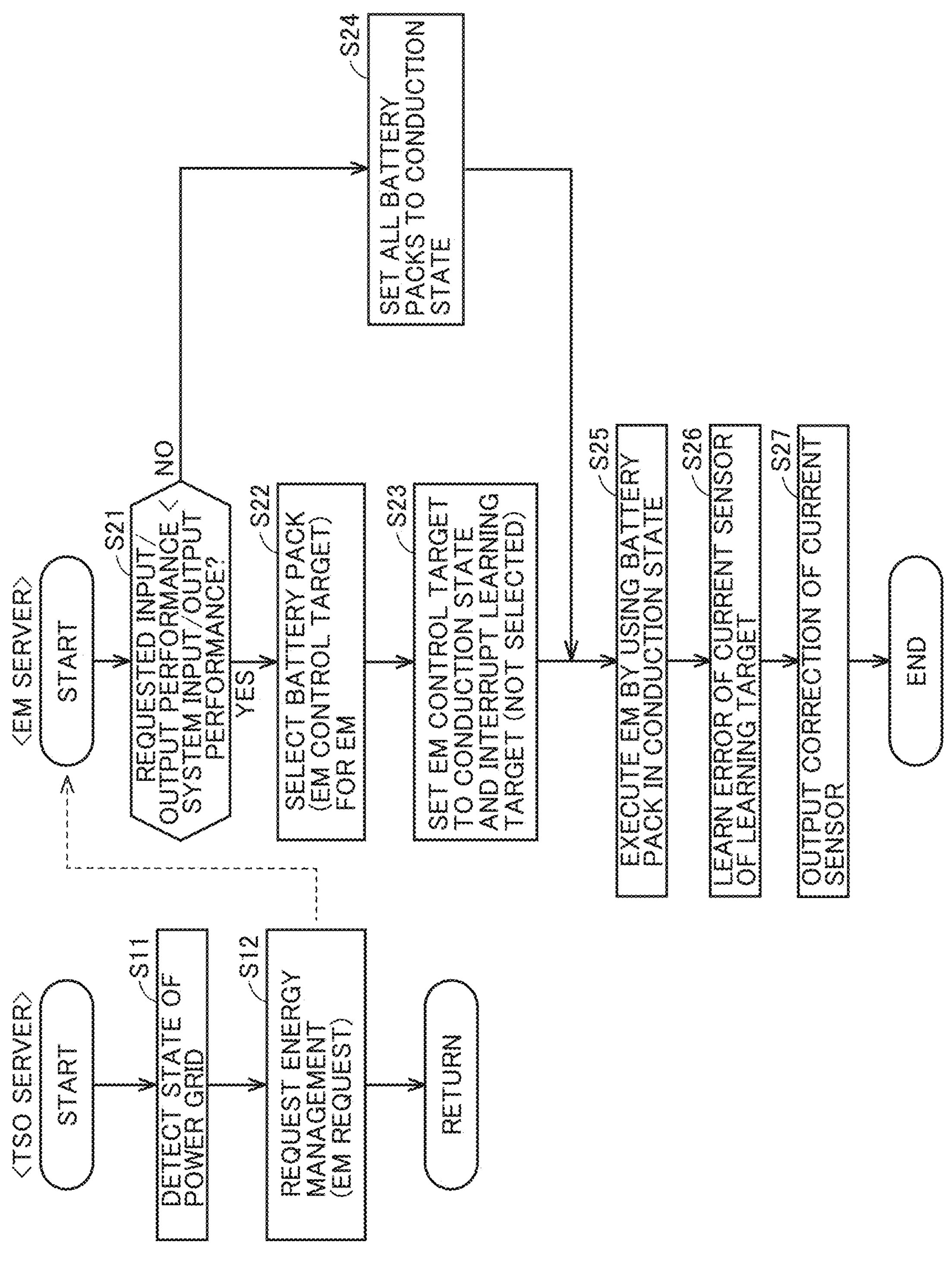
FIG. 2 is a flowchart illustrating an energy management method according to an embodiment of the present disclosure.

FIG. 2 is a flowchart showing an energy management method according to this embodiment. "S" in the flowchart means a step.

Referring to FIG. 2, server 300 periodically executes the processing flow of S11 to S12. In S11, the server 300 detects the state (for example, the supply and demand situation and the frequency) of the power grid PG. In subsequent S12, the server 300 requests the server 200 to perform energy management for improving the state of the power grid PG. Specifically, the server 300 transmits an EM request signal to the server 200. The EM request signal indicates contents of the requested energy management (e.g., charging power, discharging power, amount of charging power, or amount of discharging power). When the process of S12 is executed, the process returns to the first step (S11).

Each time the EM request signal is received from the server 300, the server 200 starts the processing flow of S21 to S27. In S21, the server 200 determines whether or not the input/output performance requested by the EM request signal is lower than the input/output performance of the power storage system 100. Specifically, if the charging power or the discharging power requested by the EM request signal is a value that can be charged or discharged by the power storage system 100 even if at least one of the battery packs 23-1 to 23-N is in the interruption state, YES is determined in S21, and the process proceeds to S22. If the charging power or the discharging power requested by the EM request signal is a value that cannot be achieved by the power storage system 100 unless all the battery packs 23-1 to 23-N are in the conduction state, or a value that cannot be achieved by the power storage system 100 even if all the battery packs are in the conduction state, a determination of NO is made in S21, and the process proceeds to S24. In S24, the server 200 sets all of the battery packs 23-1 to 23-N to the conduction state. Specifically, the server 200 places all of the SMRs 21-1 to 21-N in the connected state. Thereafter, the process proceeds to S25.

In S22, the server 200 selects one or more battery packs (hereinafter referred to as "EM control targets") to be used for energy management from the battery packs 23-1 to 23-N. The server 200 determines the EM control target so that the power storage system 100 can charge or discharge the charging power or the discharging power requested by the EM request signal. The server 200 may preferentially select the number of battery packs (EM control targets) necessary for energy management from the battery packs having a shorter elapsed time from the latest learning (output correction) of the current sensor 233*a*. When the EM request signal requests the charging power amount or the discharging power amount, the server 200 may determine the number of battery packs included in the EM control target based on the requested charging power amount or discharging power amount. When there is SOC variation in the battery packs 23-1 to 23-N, the server 200 may select the number of battery packs (EM control targets) necessary for energy management based on the SOC of each battery pack.

Figure 3:
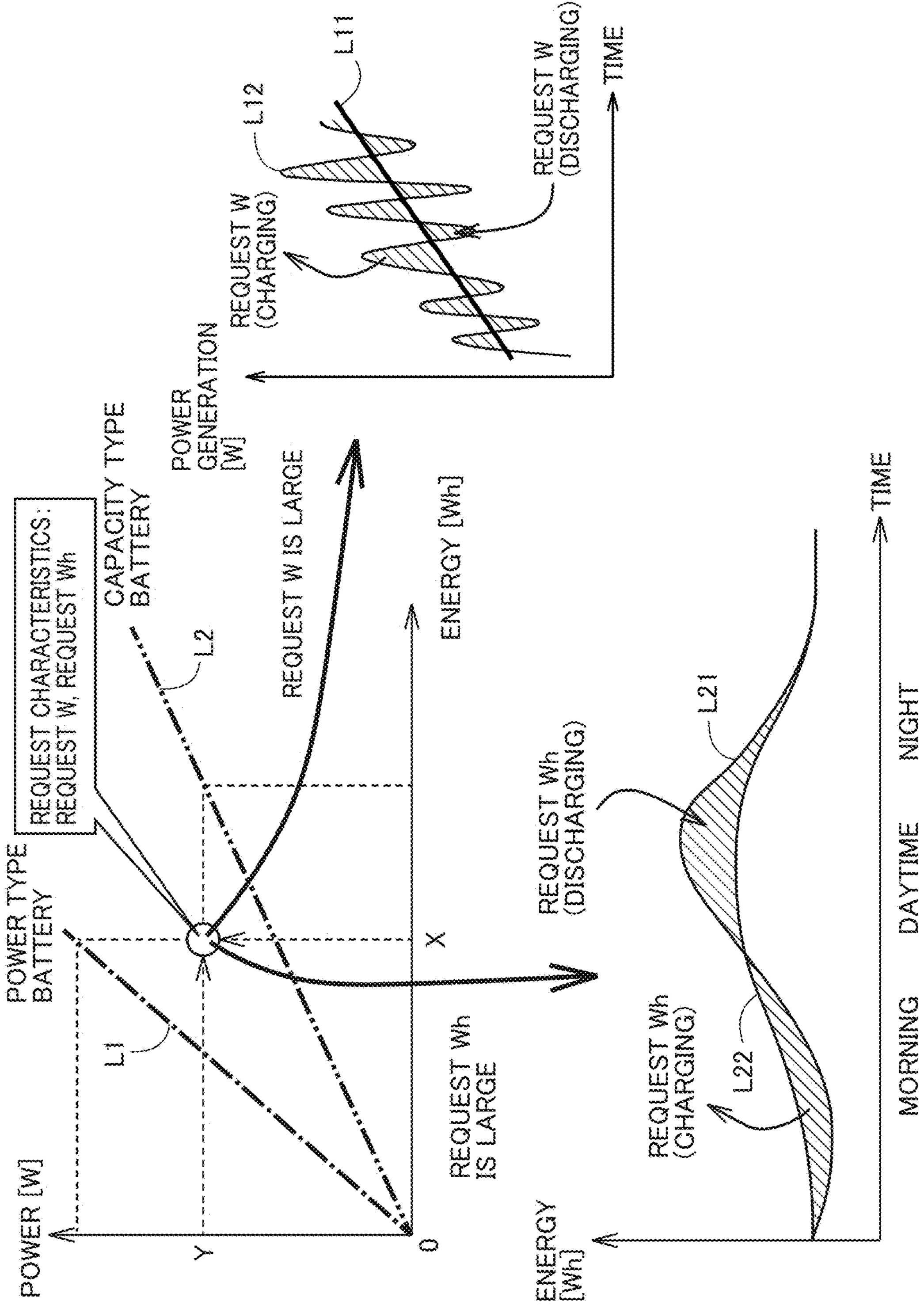
FIG. 3 is a diagram illustrating an example of energy management requested by a server that manages a power grid.

FIG. 3 is a diagram illustrating an example of energy management requested by the server 300. Hereinafter, the request of the charging power or the discharging power is referred to as a "power request", and the request of the charging power amount or the discharging power amount is referred to as an "energy request".

The power request may be a request for energy management for suppressing fluctuations in generated power output from a power plant of the power grid PG. A power plant may include a naturally fluctuating power supply whose power output varies with weather conditions. The server 200 may receive a power request for bringing the actual value L12 of the generated power in the power grid PG closer to the target value L11 from the server 300. The energy request may be a request for energy management for adjusting the supply and demand balance of the power grid PG. The server 200 may receive an energy request from the server 300 to match the power demand amount L21 and the power supply amount L22 of the power grid PG.

The battery packs 23-1 to 23-N may include a first battery pack (first power storage device) including a power type battery (first battery) and a second battery pack (second power storage device) including a capacity type battery (second battery). The first battery pack may include a battery assembly (battery 231) in which a plurality of power type batteries are electrically connected. The second battery pack may include a battery assembly (battery 231) in which a plurality of capacity type batteries are electrically connected. The rated output (W) of the power type battery is larger than the rated output (W) of the capacity type battery. The rated output corresponds to the maximum discharge power indicated by the battery manufacturer. The capacity (Wh) of the capacity type battery is larger than the capacity (Wh) of the power type battery. The battery capacity corresponds to the amount of electricity stored in a fully charged battery. The power density of the power type battery may be higher than the power density of the capacity type battery. The energy density of the capacity type battery may be higher than the energy density of the power type battery. In FIG. 3, a line L1 indicates a change (inclination) in the output power (W) and the capacity (Wh) of the power storage system 100 when the number of power type batteries in a conduction state is increased or decreased. A line L2 indicates a change (inclination) in the output power (W) and the capacity (Wh) of the power storage system 100 when the number of the capacity type batteries in the conduction state is increased or decreased.

The server 200 preferentially selects the capacity type battery (second battery pack) as the EM control target over the power type battery (first battery pack) when receiving only the energy request among the energy request and the power request, and preferentially selects the power type battery (first battery pack) as the EM control target over the capacity type battery (second battery pack) when receiving only the power request. In addition, as illustrated in FIG. 3, in a case where both the energy request in which the request Wh is X and the power request in which the request W is Y are received, the server 200 selects the EM control target so that the power storage system 100 has the input/output characteristics that respond to both the energy request and the power request.

The server 200 can individually adjust the output voltage of each battery pack included in the EM control target by the DC/DC conversion circuit 22 (power conversion circuit) of each battery pack. Therefore, the server 200 can equalize the output voltages of the battery packs included in the EM control target by individually adjusting the output voltages of the plurality of types of power storage devices (battery packs 23-1 to 23-N) having different types of batteries using the DC/DC conversion circuit 22. In such a power storage system 100, it is easy to adopt a plurality of types of batteries. According to the configuration shown in FIG. 1, for example, a stationary power storage system that performs energy management with high accuracy using a used battery can be easily realized.

Referring to FIG. 2 again, in S23, the server 200 sets each of the battery packs included in the EM control target (each of the battery packs selected in S22) to a conduction state, and interrupts the current of each of the battery packs not selected in S22 (hereinafter, referred to as "learning target"). Specifically, the server 200 sets the SMR 21 corresponding to the EM control target to the connected state (closed state) and sets the SMR 21 corresponding to the learning target to the disconnected state (open state).

In S25, the server 200 executes the energy management requested from the server 300 by using each battery pack that is in the conduction state in S23 or S24. Specifically, the server 200 controls the current value of each battery pack in the conduction state for energy management based on the detection value of the current sensor 233*a* of each battery pack in the conduction state. When the correction coefficient is set for the output of the current sensor 233*a*, the server 200 detects the current value of the battery pack 23 (battery 231) based on the output value of the current sensor 233*a* corrected by the correction coefficient. During the execution of the energy management, the server 200 may equalize the SOCs of the battery packs in the conduction state.

In subsequent S26, the server 200 learns the detection error of the current sensor 233*a* of each battery pack included in the learning target. Specifically, the server 200 acquires a zero output value (output value when no current flows) for the current sensor 233*a* of each battery pack included in the learning target, and records an error (detection error) of the zero output value with respect to the correct sensor output value in the storage device 220.

In subsequent S27, the server 200 performs output correction (correction of detection error) on the current sensor 233*a* of each battery pack included in the learning target so that the detection error acquired in S26 becomes small. For example, output correction is performed so that the output value (detected value) of the current sensor 233*a* corresponding to the battery 231 indicates 0 A when no current flows through the battery 231 of the battery pack 23 (target of learning). The output correction may be offset correction. The server 200 may determine a correction coefficient for the output of the current sensor 233*a* based on the zero output value. When the process of S27 is executed, the process flow of S21 to S27 ends.

As described above, the energy management method according to this embodiment includes the processes shown in FIG. 2. Each process is executed by one or more processors executing programs stored in one or more memories. However, these processes may be executed not by software but by hardware (electronic circuit).

The stationary power storage system according to this embodiment includes: a plurality of power storage devices (battery packs 23-1 to 23-N); a current sensor 233*a* provided in each of the plurality of power storage devices; and a control device (server 200 and battery ECU 232) that controls a current value of each of the plurality of power storage devices. Each of the plurality of power storage devices is switchable between conduction and interruption in accordance with a command from the control device. The control device selects a power storage device to be used for energy management from the plurality of power storage devices (S22) and interrupts a current of a power storage device that has not been selected (S23), for energy management, the control device controls a current value of the power storage device that has been selected (S25), and during execution of the energy management, the control device acquires an output value, when no current flows, of a current sensor corresponding to the power storage device that has not been selected (S26).

According to the above configuration, energy management can be executed by the selected power storage device. In addition, during the execution of the energy management, it is possible to acquire the output value when no current flows in the current sensor corresponding to the power storage device which is not selected. This makes it possible to correct the output of the current sensor (correct the detection error) based on the output value of the current sensor when no current flows. As described above, the stationary power storage system can perform energy management with high accuracy using the power storage device.

In the stationary power storage system according to this embodiment, during the energy management, the control device (server 200 and battery ECU 232) interrupts the current by a relay (SMR 21) corresponding to the learning target (power storage device that has not been selected) (S23), and corrects, based on the zero output value (the output value of the current sensor 233*a* when no current flows), a detection error of the current sensor 233*a* corresponding to the learning target (S27). According to such a configuration, it is possible to select an arbitrary power storage device (an EM control target) from among a plurality of power storage devices, and appropriately interrupt the current of the power storage device (a learning target) which is not selected by the relay. However, the server 200 may control the DC/DC conversion circuit 22 instead of the SMR 21 to place the battery pack 23 in the interruption state (state in which no current flows).

In the stationary power storage system according to this embodiment, each time the control device (the server 200 and the battery ECU 232) receives the EM request signal (S12) from the server 300, the processing flow of S21 to S27 is started. As a result, the processing flow of S21 to S27 is repeatedly executed. Therefore, the energy management is continuously executed by the process of S25. The control device repeatedly performs the selection of a power storage device (S22) during the execution of the energy management. Therefore, the control device can change the EM control target (the power storage device used for energy management) in response to a request from the server 300. During the execution of the energy management, the control device sequentially interrupts a current of each of the plurality of power storage devices (S23), and acquires an output value of a current sensor 233*a* of the learning target (power storage device for which the current is interrupted) (S26). This makes it possible to sequentially perform output correction (correction of detection error) of each current sensor in the battery packs 23-1 to 23-N.

The processing flow illustrated in FIG. 2 can be appropriately changed. For example, the order of processing may be changed or unnecessary steps may be omitted depending on the purpose. Further, the contents of any of the processes may be changed. FIG. 4 is a diagram showing a modification of the energy management method shown in FIG. 2. Each of the servers 200 and 300 may execute the process illustrated in FIG. 4 instead of the process illustrated in FIG. 2. In the modification illustrated in FIG. 4, the server 200 periodically executes the processing flows of S31, S32, S21A, and S23 to S27 (hereinafter, referred to as "S31 flow").

In S31, the server 200 determines an EM control target and a learning target. Among the battery packs 23-1 to 23-N, a predetermined number of battery packs are selected as learning targets, and battery packs other than the learning targets are selected as EM control targets. That is, also in this modification, the battery pack 23 which is not selected as the EM control target corresponds to the learning target. The predetermined number (the number of battery packs 23 included in the learning target) may be one or more.

In this modification, the flow of S31 is periodically executed. Therefore, the selection of the EM control target and the learning target (S31) is repeatedly performed. The server 200 may change the learning target every time the selection (S31) is performed so that the learning of all the current sensors 233*a* of the battery packs 23-1 to 23-N is performed during the execution of the energy management. The server 200 may select the battery packs 23 to be learned in the order of the battery packs 23-1, 23-2, 23-3, . . . , 23-N.

In subsequent S32, the server 200 obtains the maximum charging power and the maximum discharging power of the power storage system 100 based on the input/output characteristics of the EM control target. The server 200 may further obtain the maximum charged power amount and the maximum discharged power amount of the power storage system 100 based on the SOC of the power storage system 100. Each of the obtained maximum charged power, maximum discharged power, maximum charged power amount, and maximum discharged power amount corresponds to the input/output characteristics of the power storage system 100. Then, the server 200 transmits a signal (hereinafter, referred to as a "system signal") indicating the input/output characteristics of the power storage system 100 to the server 300. Thereafter, in S21A, the server 200 determines whether or not an EM request signal (see S12A described later) has been received from the server 300, and does not proceed with the process while the EM request signal is not received.

The server 300 starts the processing flow of S11 and S12A every time a system signal is received from the server 200. In S11, the server 300 executes processing similar to S11 in FIG. 2. In subsequent S12A, the server 300 requests EM (energy management) that is executable by the server 200 and improves the state of the power grid PG to the server 200 based on the detection result of S11 and the input/output characteristics indicated by the system signal received from the server 200. Specifically, the server 300 transmits an EM request signal indicating the content of the requested EM to the server 200. When the processing of S12A is executed, the processing flow of S11 and S12A ends.

When server 200 receives the EM request signal from server 300 (YES in S21A), the process proceeds to S23. Since the processing of S23 and subsequent steps is the same as that of S23 to S27 in FIG. 2, the description thereof will not be repeated. However, in this modification, when the process of S27 is executed, the process returns to the first step (S31).

Also with the stationary power storage system according to the above-described modification, energy management can be performed with high accuracy using the power storage device (battery pack 23). In addition, the control device (the server 200 and the battery ECU 232) according to the modification repeatedly performs the selection of a power storage device (S31) during the execution of the energy management. Therefore, the control device can change the EM control target and the learning target in response to a request from the server 300. During the execution of the energy management, the control device sequentially interrupts a current of each of the plurality of power storage devices (S23), and acquires an output value of the current sensor 233*a* of the learning target (power storage device for which the current is interrupted) (S26). This makes it possible to sequentially perform output correction (correction of detection error) of each current sensor in the battery packs 23-1 to 23-N.

The configuration of the power storage device (battery pack) is not limited to the configuration shown in FIG. 1. For example, the battery ECU 232 may be omitted. The server 200 may directly control the SMR 21 and the DC/DC conversion circuit 22 without using the battery ECU 232. The power grid PG is not limited to a large-scale AC grid, and may be a micro grid or a DC grid. In a form in which the power grid PG is a DC grid, the DC/AC conversion circuit 10 may be omitted. Instead of EM (energy management) for the power grid, another EM (For example, EM for off-grid buildings, or EM for adjustment power sold in the power market) may be executed.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A stationary power storage system, comprising:
a plurality of power storage devices;
a plurality of current sensors provided in the plurality of power storage devices, respectively; and
a control device configured to control a current value of each of the plurality of power storage devices, wherein
each of the plurality of power storage devices is configured to be switchable between conduction and interruption in accordance with a command from the control device,
the control device is configured to:
select at least one power storage device to be used for energy management from the plurality of power storage devices and interrupt a current of at least one power storage device that has not been selected,
for the energy management, control a current value of the at least one power storage device that has been selected,
during execution of the energy management, acquire an output value, when no current flows, of at least one current sensor of the plurality of current sensors, the at least one current sensor corresponding to the at least one power storage device that has not been selected, and
perform output correction for the at least one current sensor of the plurality of current sensors when no current flows.

2. The stationary power storage system according to claim 1, wherein
the plurality of power storage devices are connected to each other in parallel,
the stationary power storage system further comprising a plurality of relays that are provided in the plurality of power storage devices, respectively,
each of the plurality of relays being configured to switch between conduction and interruption of a corresponding power storage device of the plurality of power storage devices in accordance with a command from the control device, and the control device is configured to during the execution of the energy management, interrupt the current by at least one relay of the plurality of relays, the at least one relay corresponding to the at least one power storage device that has not been selected, and correct, based on the output value of the current sensor when no current flows, a detection error of the at least one current sensor corresponding to the at least one power storage device that has not been selected.

3. The stationary power storage system according to claim 1, wherein the plurality of power storage devices are connected to each other in parallel, the stationary power storage system further comprising a plurality of power conversion circuits that are provided in the plurality of power storage devices, respectively, each of the plurality of power conversion circuits being configured to transform an output voltage of a corresponding power storage device of the plurality of power storage devices in accordance with a command from the control device, wherein the plurality of power storage devices include a first power storage device including a first battery and a second power storage device including a second battery different in type from the first battery.

4. The stationary power storage system according to claim 1, wherein the control device is configured to repeatedly perform the selection of a power storage device during the execution of the energy management, and the control device is configured to during the execution of the energy management, sequentially interrupt a current of each of the plurality of power storage devices, and acquire an output value of a current sensor of the plurality of current sensors, the current sensor corresponding to the power storage device for which the current is interrupted.

5. The stationary power storage system according to claim 1, wherein the stationary power storage system is configured to execute energy management of a power grid in response to a request from a server that manages the power grid, and the control device is configured to always accept the request from the server.

6. The stationary power storage system according to claim 1, wherein the control device is further configured to perform the output correction for the at least one current sensor of the plurality of current sensors such that the output value of the at least one current sensor indicates 0 when no current flows.

* * * * *